(12) United States Patent
Ahuja et al.

(10) Patent No.: US 8,020,580 B2
(45) Date of Patent: Sep. 20, 2011

(54) DRAIN PIPE CONNECTOR FOR FLUID FILTERS

(75) Inventors: Rajan Ahuja, Fayetteville, NC (US); L. Steven Cline, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 462 days.

(21) Appl. No.: 12/168,293

(22) Filed: Jul. 7, 2008

(65) Prior Publication Data

US 2010/0000930 A1    Jan. 7, 2010

(51) Int. Cl.
*B01D 35/30* (2006.01)
*F16L 15/00* (2006.01)

(52) U.S. Cl. .................................. 137/317; 210/248

(58) Field of Classification Search .................. 137/317, 137/318, 315.41; 210/248, 464, 465; 285/390
See application file for complete search history.

(56) References Cited

U.S. PATENT DOCUMENTS

| 1,240,161 | A | * | 9/1917 | Olds | 251/149 |
| 2,294,330 | A |   | 8/1942 | Clark | |
| 5,299,777 | A | * | 4/1994 | Milstead | 251/144 |
| 7,150,828 | B2 |   | 12/2006 | Sakata et al. | |

FOREIGN PATENT DOCUMENTS

| EP | 1430941 A1 | 6/2004 |
| EP | 1522338 A2 | 4/2005 |
| JP | 11-104408 A | 4/1999 |

OTHER PUBLICATIONS

Corresponding European office action dated Aug. 17, 2009.

\* cited by examiner

*Primary Examiner* — Kevin L Lee
(74) *Attorney, Agent, or Firm* — Crowell & Moring LLP

(57) ABSTRACT

The present invention is directed to a no-leak drain pipe connector for a fluid filter which helps prevent the splashing of hot fluid on individuals performing filter element and oil changes.

12 Claims, 6 Drawing Sheets

DRAIN PIPE CONNECTOR FOR FLUID FILTERS

FIELD OF THE INVENTION

The present invention relates to fluid filter assemblies. In particular, the present invention relates to a no-leak drain pipe connector for a fluid filter.

BACKGROUND OF THE INVENTION

Filter are commonly used to separate contaminants from a fluid stream passing through a fluid system. Fluid filters typically use a filter media which has a structure that traps the contaminants either within the media, or causes the contaminants to collect on the outer surface of the media. In order maintain effectiveness, many fluid filters require the filter elements be changed at regular intervals.

Filter elements are typically housed in metallic or non-metallic or combination housings. The housings are usually designed with threads for connection to drain plugs to seal the drain hole of the filet. The same hole is used for drain connectors or pipes with adaptors to drain out the dirty oil or fuel from the housing during the filter element change process.

Current drain connectors are described in U.S. Pat. No. 7,150,828 (the '828 patent). The '828 patent discloses a drain connector that requires hooking keys that are difficult to mount because the slots in the lower housing are obscured from view. Use of this connector results in the splashing of fluid as the drain connect contacts the spring loaded resilient cap thereby resulting in the opening of the cap simultaneously as the hooks of drain tool engage the hooking slots in the housing. The drain tool described in the '828 patent also requires an o-ring (sealing ring). If the user of the drain tool described in the '828 patent neglects to use the o-ring the result is leakage and splashing. Disconnecting the drain tool of the '828 patent also results in spillage and splashing of fluid as a result of the hook design from lower slots in the housing.

The present invention provides an improved drain connector that reduces splashing and spillage during filter element and oil changes. The present invention comprises a new design of drain connector which is easier to connect as it comprises wings on pipe for mounting and de-mounting of drain connector and sealing is achieved by self locking seal tapers at two locations (primary and secondary) on a nylon connector as a result of its unique shape. Thus, no-additional o-rings are required to prevent leakage from connection. This type of drain pipe connector is useful for draining oil from any plastic or metallic oil filter or fuel filter housing installed on automotive or stationary engines at the time of change of filtration elements.

SUMMARY OF THE INVENTION

The present invention provides an improved drain connector that reduces splashing and spillage during filter element and oil changes. The drain connector of the instant invention is easy to connect to filter housings and may be used in methods of draining the fluid filters installed on automotive or stationary engines.

One embodiment of the instant invention encompasses a connector for attaching a drain pipe to a fluid filter assembly comprising a self sealing taper and feeding threads.

Another embodiment of the instant invention encompasses a connector for attaching a drain pipe to a fluid filter assembly comprising a self sealing taper, feeding threads, a secondary seal, and finger wings.

A further embodiment of the instant invention encompasses a tool for draining fluid from a filter assembly comprising at least one drain port, a drain pipe, a self sealing taper, feeding threads, a secondary seal, and finger wings.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
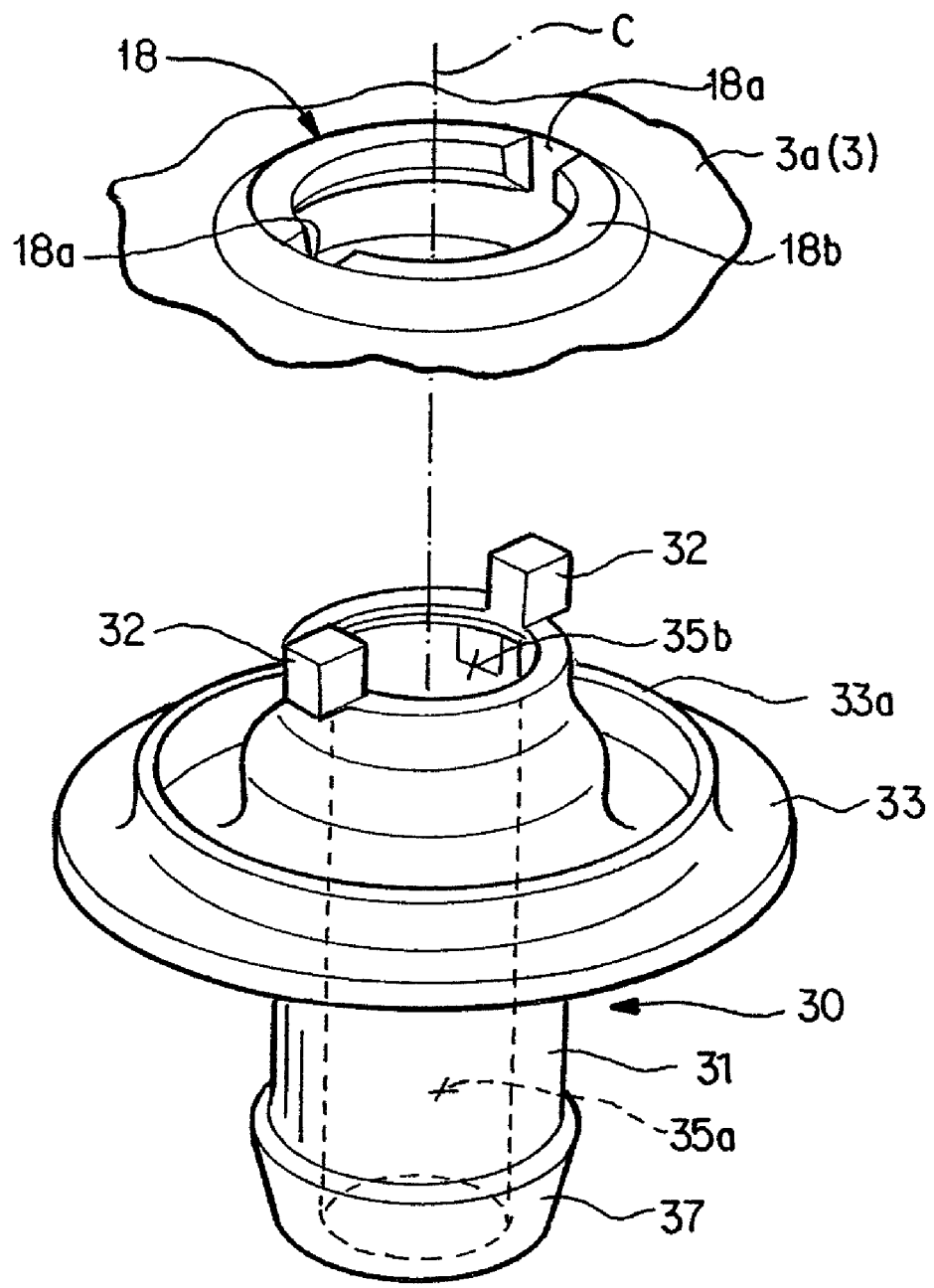
FIG. 1 is a diagram of a prior art drain structure for a fluid filter.
Figure 2:
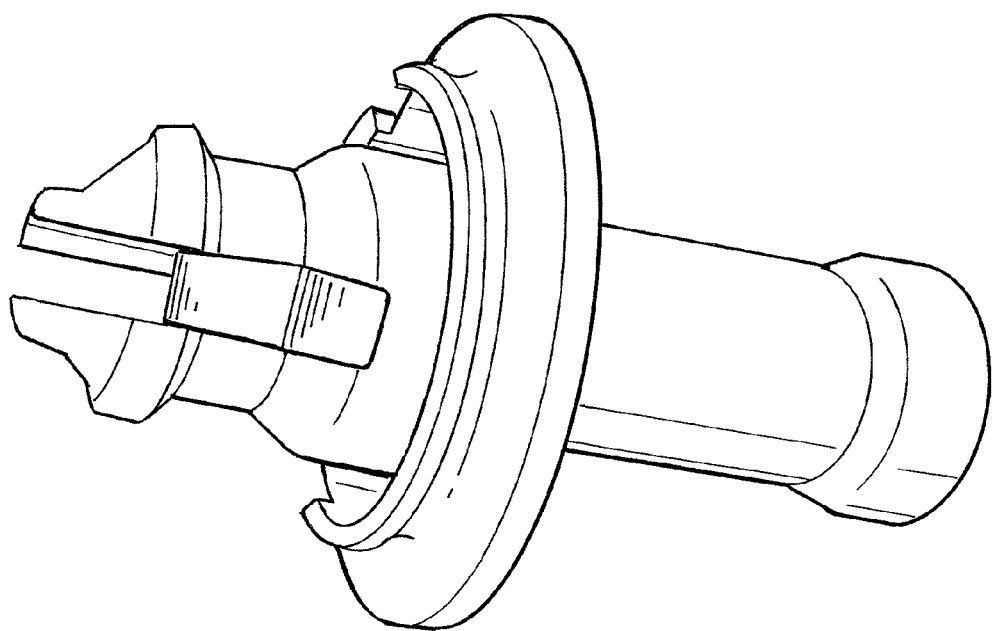
FIG. 2 is a photograph of a prior art drain structure for a fluid filter.
Figure 3:
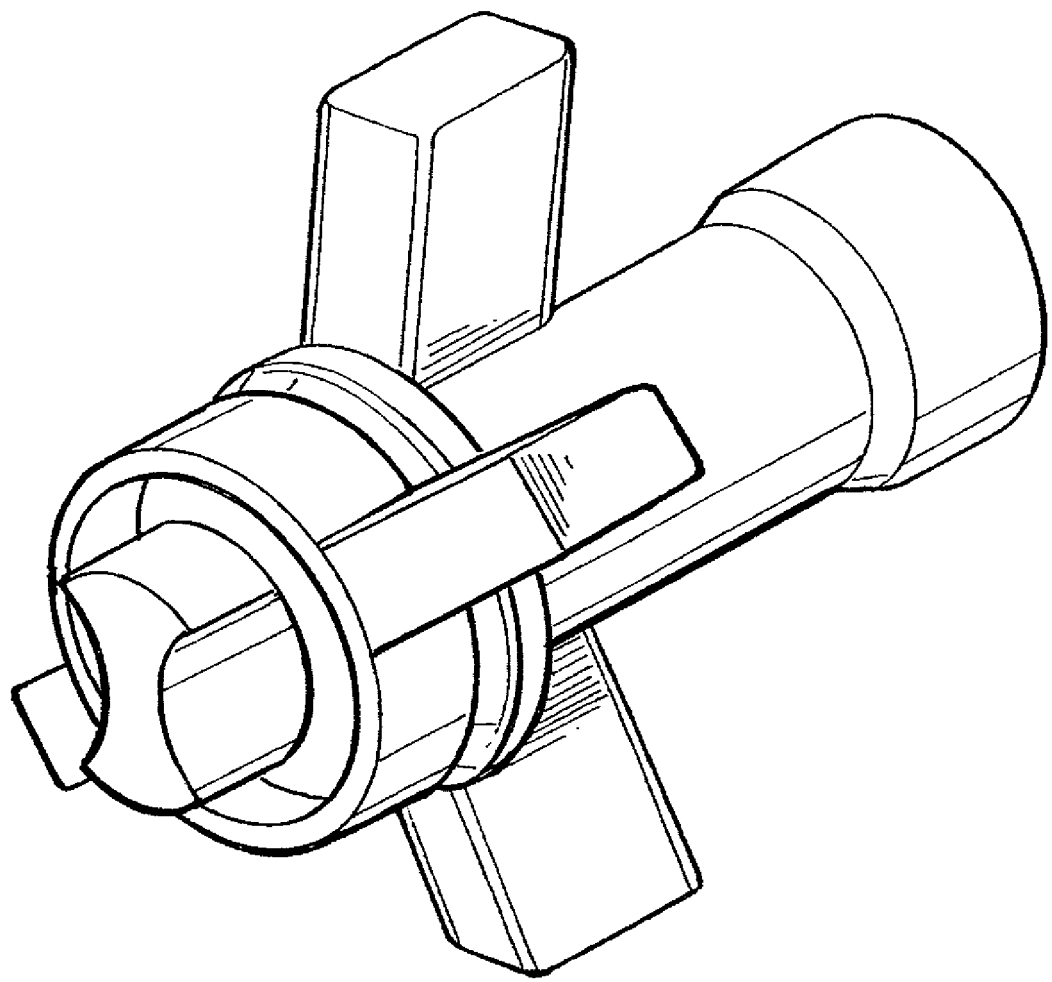
FIG. 3 is a photograph of one embodiment of the drain pipe connector in accordance with the instant invention.

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation. Further, although certain methods are described with reference to certain steps that are presented herein in certain order, in many instances, these steps may be performed in any order as would be appreciated by one skilled in the art, and the methods are not limited to the particular arrangement of steps disclosed herein.

The present invention improves handling and removal of used filter elements from filter housings and reduces splashing of hot fluid on individuals handling the filter element and oil change at required intervals. The present invention is a new design of drain connector which is easier to connect to filter assemblies. The drain connector of the present invention comprises wings on pipe for ease of mounting and de-mounting of the drain connector. Sealing of the drain connector to the drain hole in the filter is achieved by self locking seal tapers at two locations (primary and secondary). The sealing is achieved by the tapered shape, no-additional o-rings are required to prevent leakage from connection. The drain pipe connector of the instant invention may be used to drain fluids from any plastic or metallic oil filter or fuel filter housing installed on automotive or stationary engines.

Drain connectors in accordance with the present invention may be manufactured from metallic or non-metallic materials (plastics or substitutes). Drain connectors of the present invention are designed with a threaded plug instead of the typical split-type push-pull hooking designs which push open resilient drain valves instantly as hooks fit-in the hooking slots in lower filter element housing. Thus, drain connectors of the instant invention prevent the fluid spills that result from the use of prior drain connectors. The present invention seals the drain hole with its self-sealing taper immediately at the end of the push pilot. Thus, there is already a seal when the push pilot starts opening the resilient drain valve cap.

Because of the innovative taper design, there is no need for o-rings for sealing. This saves the cost of additional parts and prevents accidental spillage associated with a failure to use an o-ring with current connectors.

Drain connectors of the instant invention may further comprise two tightening wings 180 degrees apart like that of a wing nut for ease of handling and mounting the drain connector. This eliminates the need for push-pull forces causing splash and spillage. There is no need to use wrenches or spanners for attaching or detaching the present drain connectors to fluid filter assemblies.

The instant drain connector may also comprise drain holes connecting with drain pipe situated 180 degrees apart on the sides of the pilot pin with a 90 degree orientation to the finger wings. This further helps make filter element changes a clean process that prevents any seepage on the hand of any individual changing oil filter elements.

Figure 4:
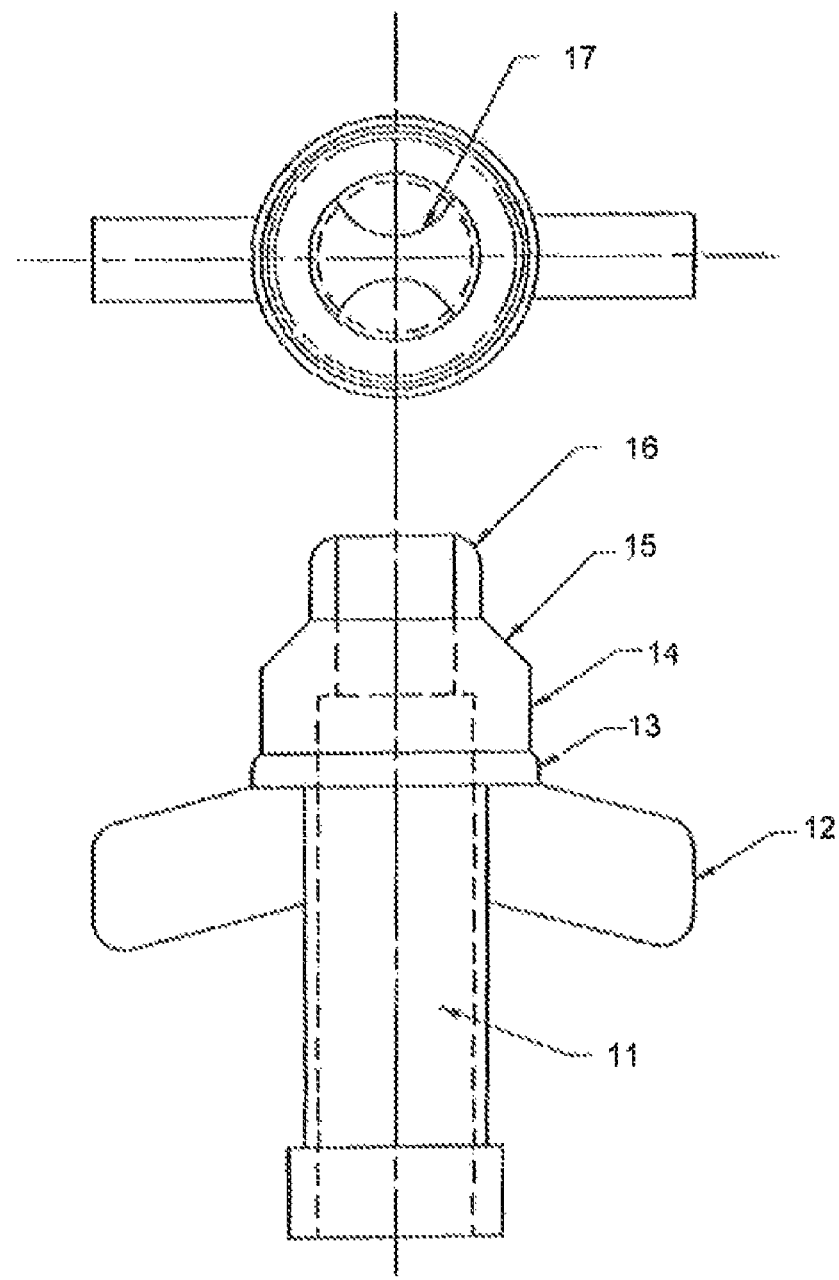
FIG. 4 is a diagram of an embodiment of a drain pipe connector in accordance with the instant invention.
Figure 5:
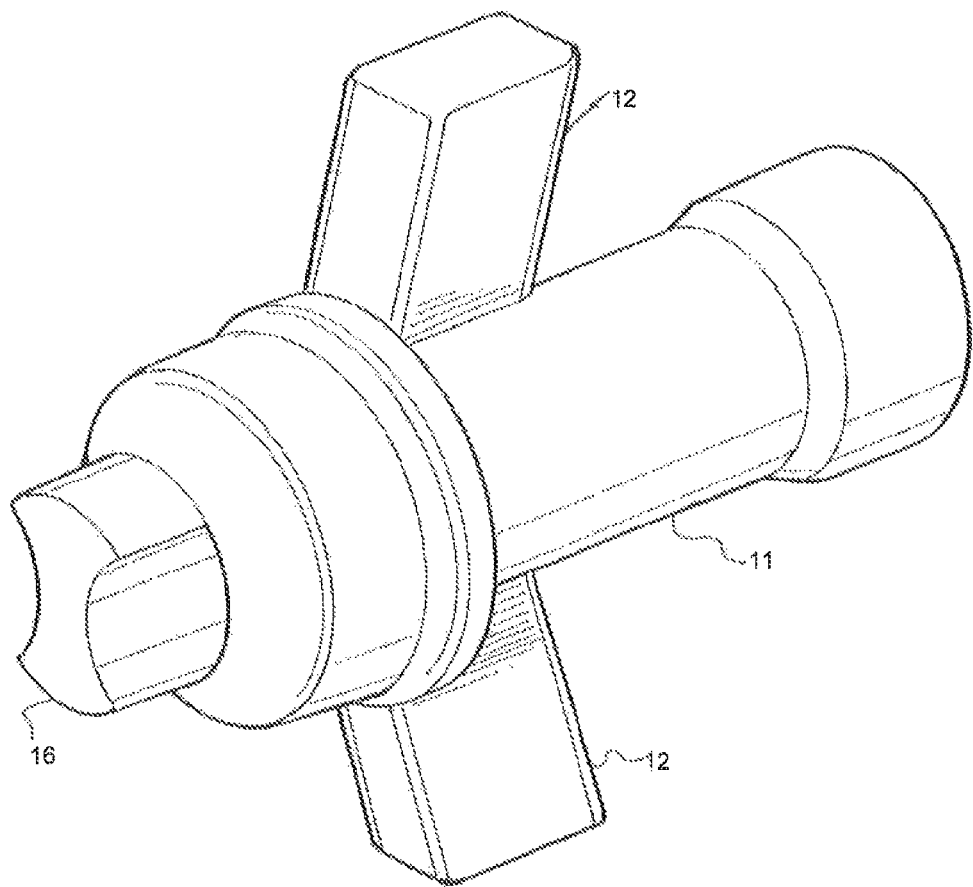
FIG. 5 is a three dimensional view of an embodiment of the drain pipe connector of the instant invention.
Figure 6:
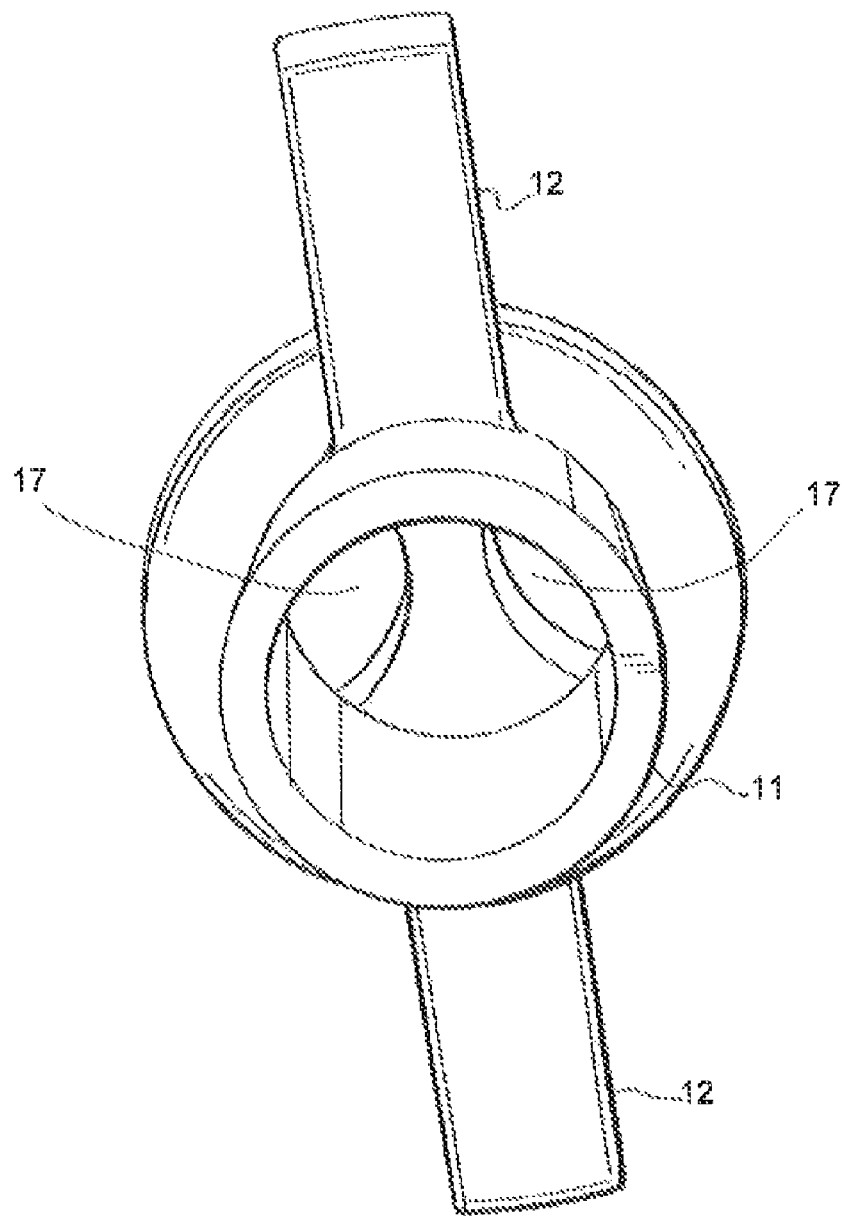
FIG. 6 is a three dimensional view of an embodiment of the drain thru connection of the instant invention.

Referring now to FIG. 4, in one embodiment of the instant invention, a tool such as drain connector for draining a fluid filter comprises drain pipe 11, finger wings 12, primary self-sealing taper 15, feeding threads 14, secondary seal 13, push pilot 16 and drain port(s) 17. The operation of the drain connector is described above in the specification, and thus is not repeated here. FIG. 5 is a three dimensional view of an embodiment of the drain pipe, and FIG. 6 is a three dimensional view of an embodiment of the drain thru connection of the instant invention.

While the invention has been described with reference to certain exemplary embodiments thereof, those skilled in the art may make various modifications to the described embodiments of the invention without departing from the scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended.

Those skilled in the art will recognize that these and other variations are possible within the scope of the invention as defined in the following claims and their equivalents.

What is claimed is:

1. A tool for draining a fluid filter comprising drain ports, a primary self sealing taper, a secondary self sealing taper, feeding threads, and a drain pipe, wherein the primary and secondary self sealing tapers provide substantially all sealing between the tool and the fluid filter.

2. The tool of claim 1, further comprising finger wings.

3. The tool of claim 1, further comprising a secondary seal.

4. The tool of claim 1, further comprising a push pilot.

5. The tool of claim 1, wherein the feeding threads are disposed between the primary and secondary self sealing tapers.

6. A tool for draining fluid from a filter assembly comprising:
   at least one drain port;
   a drain pipe;
   a push pilot;
   a primary self sealing taper;
   a secondary self sealing taper;
   feeding threads;
   and
   finger wings,
   wherein the primary and secondary self sealing tapers provide all sealing between the tool and the filter assembly.

7. The tool of claim 6, wherein the tool is constructed of a metal.

8. The tool of claim 6, wherein the tool is constructed of plastic.

9. The tool of claim 6, wherein the feeding threads are disposed between the primary and secondary self sealing tapers.

10. A connector for attaching a drain pipe to a fluid filter assembly comprising:
    a primary self sealing taper;
    a secondary self sealing taper; and
    feeding threads,
    wherein the primary and secondary self sealing tapers provide substantially all sealing between the connector and the fluid filter assembly.

11. The connector of claim 10, further comprising finger wings.

12. The connector of claim 10, wherein the feeding threads are disposed between the primary and secondary self sealing tapers.

* * * * *